United States Patent
Manne et al.

[11] Patent Number: 5,743,016
[45] Date of Patent: Apr. 28, 1998

[54] METHOD FOR MOUNTING PRELOADED BEARINGS

[75] Inventors: Nils Manne, Göteborg; Per-Olof Johansson, Jörlanda, both of Sweden

[73] Assignee: Aktiegolaget SKF, Goteborg, Sweden

[21] Appl. No.: 647,112

[22] Filed: May 9, 1996

[30] Foreign Application Priority Data

May 10, 1995 [SE] Sweden .................................. 9501722

[51] Int. Cl.⁶ ...................................................... B23P 15/00
[52] U.S. Cl. .................. 29/898.062; 29/447; 29/898.07; 29/898.09; 384/563
[58] Field of Search ........................ 29/898.07, 898.062, 29/447, 898.09; 384/563, 585

[56] References Cited

U.S. PATENT DOCUMENTS

| | | | |
|---|---|---|---|
| 2,762,112 | 9/1956 | Kylen ........................... | 29/898.07 |
| 3,313,581 | 4/1967 | Kusakabe . | |
| 3,574,424 | 4/1971 | Hagemeister . | |
| 3,579,780 | 5/1971 | Matt ............................. | 29/447 |
| 3,620,586 | 11/1971 | Maastricht .................... | 384/563 |
| 3,664,718 | 5/1972 | Uhtenwoldt . | |
| 3,716,280 | 2/1973 | Leibensperger et al. . | |
| 3,726,576 | 4/1973 | Barnbrook et al. ........... | 384/563 |
| 3,746,412 | 7/1973 | Hay ............................. | 384/563 |
| 3,943,863 | 3/1976 | Hafla ........................... | 384/563 |
| 4,054,999 | 10/1977 | Harbottle ..................... | 29/898.07 |
| 4,629,354 | 12/1986 | Freese ......................... | 29/447 |
| 5,030,016 | 7/1991 | Schoeffter ................... | 290/898.09 |
| 5,386,630 | 2/1995 | Fox ............................. | 29/898.07 |
| 5,388,917 | 2/1995 | Hibi et al. . | |
| 5,535,517 | 7/1996 | Rode ........................... | 29/898.09 |

FOREIGN PATENT DOCUMENTS

| | | |
|---|---|---|
| 0 688 967 | 12/1995 | European Pat. Off. . |
| 1066989 | 6/1954 | France . |
| 1511836 | 4/1992 | France . |
| 18 34 811 | 7/1961 | Germany . |
| 1 834 811 | 7/1981 | Germany . |
| 85 35 194 | 5/1988 | Germany . |
| 85 35 194.6 | 5/1989 | Germany . |
| 7210816 | 9/1976 | Sweden . |
| 2006701 | 1/1994 | U.S.S.R. . |

*Primary Examiner*—Larry I. Schwartz
*Assistant Examiner*—Marc W. Butler
*Attorney, Agent, or Firm*—Burns, Doane, Swecker & Mathis, L.L.P.

[57] ABSTRACT

A method for mounting on a shaft extending through a housing a preloaded rolling bearing assembly incorporating first and second rolling bearings capable of supporting axial load, involves mounting the outer race rings of both bearings in axially fixed positions in the housing, mounting the inner race rings with a shrink fit on the shaft and with rolling bodies disposed between the inner and outer race rings, and introducing in the interface between the inner envelope surface of the inner race ring of the second bearing and the shaft a pressure medium to create a thin medium film in the interface for allowing the inner race ring of the second bearing to be axially displaced on the shaft. An axial force is then applied to the inner race ring of the second bearing and the axial force thus applied is measured. The pressure medium is then drained from the interface between the inner race ring and the shaft when a predetermined axial force is reached, whereupon the axial force is relieved.

9 Claims, 1 Drawing Sheet

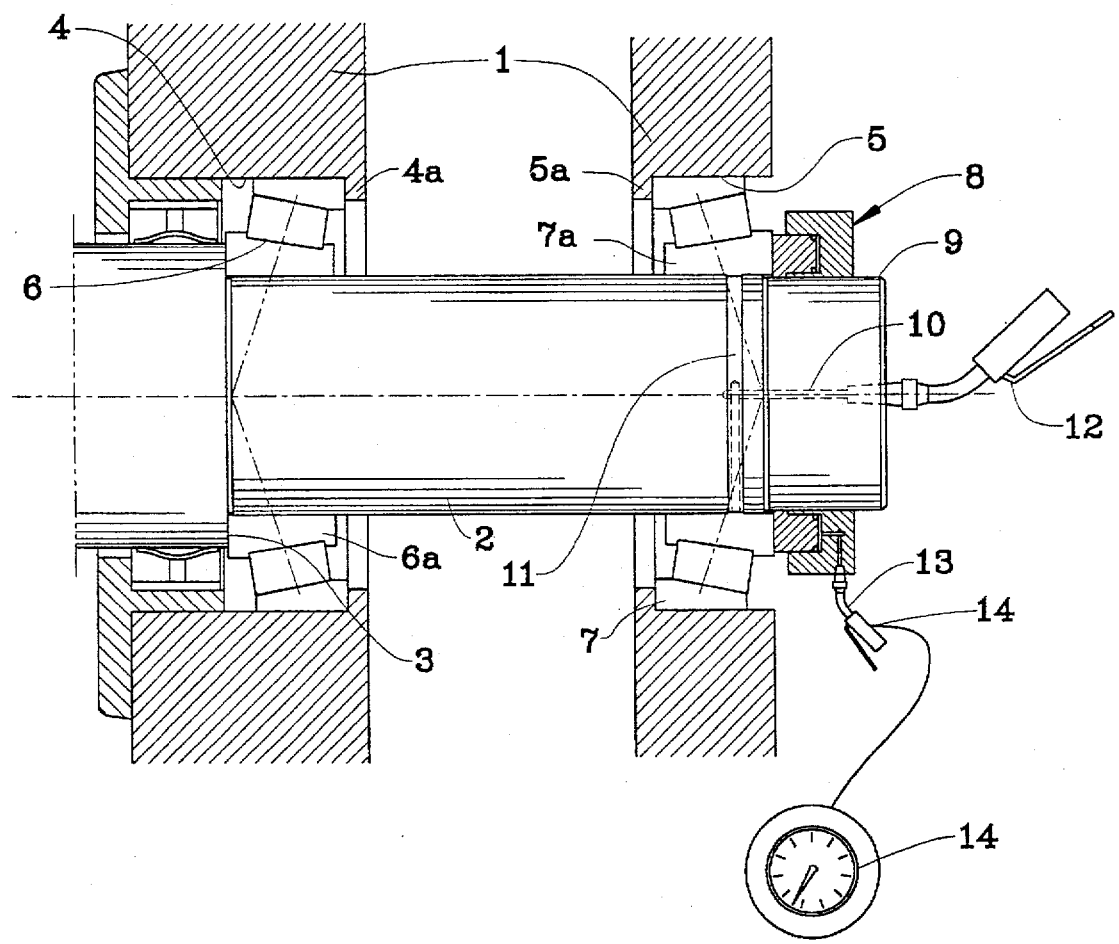

METHOD FOR MOUNTING PRELOADED BEARINGS

FIELD OF THE INVENTION

The present invention relates to bearings and more specifically pertains to a method for mounting pre-loaded bearings, particularly bearings that carrying axial loads, on a cylindrical bearing seat.

BACKGROUND OF THE INVENTION

Many bearing assemblies, e.g., wheel bearings for industrial trucks, often consist of two taper roller bearings mounted in a back-to-back arrangement. The wheel bearing assembly of an industrial truck should typically be adjusted to a predetermined preload. In order to make it possible to provide the bearings with a correct bearing clearance, the inner bearing race ring is usually mounted with a loose fit on the shaft. A loose fit, however, typically involves a compromise as there exists a big risk of wear between the inner race ring and the shaft. The problem associated with the type of fit that is required to eliminate this wear problem is that it is difficult to adjust the position of the bearing race ring for accomplishing a correct clearance or preload.

FR-A-1 066 989 refers to a bearing assembly comprising two taper roller bearings mounted in a back-to-back arrangement, whereby the shaft is provided with a channel system for supplying oil pressure to the area between the shaft and the inner race ring of one of the bearings. By virtue of this arrangement, it is possible to inject pressure medium in the channel system, thereby separating the shaft surface and the corresponding surface of the inner race ring. In this way, the inner race ring can be readily displaced along its bearing seat, and with the aid of a mounting sleeve pressing against the side face of the bearing ring this can be moved to a position giving the desired preload. This document, however, does not propose a method for applying the required force for reaching a predetermined preload in a simple and reliable manner.

SE-A-7210816-0 refers to a support of a precision spindle for machine tools, incorporating a conventional taper roller bearing and a specially designed taper roller bearing, which both have their outer and inner race rings axially arrested. A hydraulic piston-cylinder is provided to actively move the rollers of the specially designed taper roller bearing in the axial direction continuously during operation of the bearing assembly to compensate for speed differences. This bearing assembly suffers from the drawback that it is very expensive. In addition, the bearing assembly suffers from the disadvantage that the preload of the bearing assembly disappears instantly if the hydraulic pressure is interrupted for any reason.

SUMMARY OF THE PRESENT INVENTION

The present invention is designed to provide a method for mounting preloaded bearings, particularly taper bearings or angular contact bearings, on a cylindrical bearing seat, by which method it is suggested how the adjustment force is to be applied and primarily how a proper or correct adjustment force is to be established.

BRIEF DESCRIPTION OF THE DRAWING FIGURE

Hereinafter the invention will be further described with reference to the accompanying drawing figure which illustrates an embodiment of a bearing assembly in which the method according to the invention is carried out.

DETAILED DESCRIPTION OF THE PRESENT INVENTION

The drawing figure shows a bearing assembly incorporating a bearing housing 1 in which is received a cylindrical shaft 2 having a shoulder 3. The bearing housing 1 has two axially spaced apart seats 4, 5, each of which is provided with a respective radially inwardly directed annular shoulder 4a, 5a. The shaft 2 is supported in two taper roller bearings 6, 7 that are mounted in a back-to-back arrangement. Each of the bearings 6, 7 has an outer race ring that is mounted in its respective bearing seat 4 and 5 in the bearing housing with a hard fit. Each bearing 6, 7 bears against the respective bearing housing shoulder 4a and 5a, whereby the outer race rings are positioned axially.

During mounting, the inner race ring 6a of the innermost bearing 6 is heated and is mounted on its bearing seat on the shaft 2 bearing against the shoulder 3, whereupon the shaft 2 with the inner race ring 6a thus mounted is inserted in the housing 1 and located in its proper position. Rolling bodies are disposed between the inner and outer race rings of each respective roller bearing 6, 7. Thereupon, the inner race ring 7a of the outermost bearing 7 is heated and positioned in its position on the shaft 2, whereupon the assembly is allowed to cool.

Then a hydraulic nut 8 is mounted on a threaded portion 9 of the shaft 2 outside the inner race ring 7a of the outermost bearing 7.

The shaft 2 has a duct 10 communicating with a circumferential groove 11 in the shaft 2 at a position corresponding to the location of the axially outermost bearing 7. An oil pump 12 is connected to the duct and oil pressure is injected in the circumferential groove 11 in accordance with the well-known SKF Oil Injection Method, whereby the area between the contacting envelope surfaces of the shaft 2 and the inner race ring 7a is put under pressure. Thus, the contacting envelope surfaces are separated by an oil film which makes it possible to readily displace the inner race ring 7a in its bearing seat on the shaft 2.

At this moment, the hydraulic nut 8 is pressurized via an oil pump 13 with a pressure gauge 14, while at the same time the bearing is rotated for ascertaining that all rollers are correctly positioned in the bearing. The pressure of the oil delivered to the hydraulic nut by the oil pump 13 is read on the pressure gauge 14, and as the piston area of the hydraulic nut is known, it is very easy to establish the preload force applied to the outer bearing 7 as this is the product of the hydraulic pressure P and the area A of the piston, that is Fa=P·A.

When the pressure read on the pressure gauge 14 has reached the correct value for causing the predetermined preload in the bearing assembly, the oil pressure contained in the duct 10 and the groove 11 is drained via the oil pump 12. Thus, the pressure separating the shaft envelope surface and the inner envelope surface of the inner race ring 7a is relieved and the grip of the race ring around the shaft is re-established.

Thereupon, the pressure acting upon the hydraulic nut 8 is relieved. Now the hydraulic nut is dismounted or removed, and a lock nut is mounted for securing the preloaded bearing assembly.

In order to facilitate the method even further, it is also suggested that the gauge of the hydraulic nut be designed or equipped with means for directly showing the momentary preload in the bearing assembly. This can be achieved by means of a digital gauge, which, e.g., can show the actual pressure and also the actual preload by multiplying in a calculating unit the actual pressure with the piston area for the hydraulic nut used. Such display devices are readily available, and can be used for different hydraulic nuts, whereby data about the piston area of the nut is stored manually in the calculating unit.

Such display means also can take the form of loose gauge face plates, e.g., delivered together with the hydraulic nut, and having a series of indices representing preload, i.e. pressure values multiplied with the known piston area of the hydraulic nut to which the gauge face plate is associated. Such gauge face plates can be attachable to and readily removable or exchangeable from the pressure gauge 14.

This method gives a simple and repetitive preload. The method is inexpensive and reliable and gives a shortened time of mounting with increased accuracy and quality of the finished bearing assembly.

The preloaded bearing assembly will maintain its preload, as the inner race ring 7a of the outermost bearing 7 will resume its shrink fit to the shaft as soon as the oil pressure acting in the circumferential groove 11 in the shaft 2 is relieved. Therefor, future preload is not dependent upon a maintained hydraulic pressure, either in the duct 10 or in the hydraulic nut.

Although the bearing assembly as shown and described incorporates two taper roller bearings, it is evident that the method according to the invention can be used for axial preloading of any bearing assembly carrying axial load, e.g., angular contact bearings, bearings having an axial contact flange and even deep groove ball bearings.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for mounting a preloaded rolling bearing assembly on a shaft extending at least partly through a housing, the preloaded rolling bearing assembly incorporating a first and a second rolling bearing for supporting axial load, comprising:

mounting an outer race ring of the first bearing and an outer race ring of the second bearing in axially fixed positions in the housing, and mounting an inner race ring of the first bearing and an inner race ring of the second bearing on the shaft with a shrink fit, with rolling bodies being disposed between said inner race ring of said first bearing and said outer race ring of said first bearing and between said inner race ring of said second bearing and said outer race ring of said second bearing;

introducing a pressure medium in an interface between an inner envelope surface of the inner race ring of the second bearing and the shaft to create a thin medium film in said interface for allowing said inner race ring of the second bearing to be axially displaced on the shaft;

applying an axial force to said inner race ring of the second bearing;

measuring the applied axial force;

draining the pressure medium from the interface between said inner race ring of the second bearing and the shaft when a predetermined axial force is reached, and relieving said axial force.

2. A method as claimed in claim 1, wherein the axial force is applied by a hydraulic nut having a piston, and the axial force applied is established as a product of the pressure in the hydraulic nut and the area of the piston of said hydraulic nut.

3. A method as claimed in claim 2, wherein the step of measuring the applied axial force includes utilizing a pressure gauge connected to the hydraulic nut and having a scale face plate showing an actual axial force applied to the inner race of the second bearing.

4. A method as recited in claim 3, including a calculating unit operatively associated with the gauge and arranged to calculate and display the actual axial force after multiplication of hydraulic pressure and piston area of the hydraulic nut.

5. A method as recited in claim 3, including using a loose gauge face plate associated with the hydraulic nut and having a graduation showing axial force as a product of temporary pressure value and known area of said hydraulic nut, applying said gauge face plate over a face plate of the gauge, and using values read off the gauge face plate as true axial force values.

6. A method for mounting an axial load carrying preloaded rolling bearing assembly on a cylindrical bearing seat, the assembly including a first bearing and a second bearing, comprising:

mounting an outer race ring of said first bearing and an outer race ring of the second bearing in respective seats of a housing in axially fixed positions;

mounting an inner race ring of the first bearing in an axially fixed position on a cylindrical seat on a shaft with a set of rolling bodies disposed between the inner race ring of the first bearing and the outer race ring of the first bearing;

inserting the shaft with said inner race ring of the first bearing in the housing;

mounting an inner race ring of the second bearing on the shaft with a set of rolling bodies disposed between the inner race ring of the second bearing and the outer race ring of the second bearing;

mounting a hydraulic nut on the shaft to bear against a side of the inner race ring of the second bearing that faces away from the first bearing;

introducing, via a channel in the shaft, a pressure medium between an inner surface of the inner race ring of the second bearing and an outer surface of the shaft to separate the inner surface of the inner race ring of the second bearing and the outer surface of the shaft by an oil film;

pressurizing the hydraulic nut to apply an axial pressure on the inner race ring of the second bearing;

reading an actual hydraulic pressure value on a gauge operatively connected to the hydraulic nut;

calculating an actual axial force applied to the bearing assembly as a product of said actual hydraulic pressure value read from the gauge and a known area of the hydraulic nut;

draining the pressure medium from between the outer surface of the shaft and the inner surface of the inner race ring of the second bearing when a predetermined axial force has been reached to thus allow said inner race ring of the second bearing to be held with a fit in an axial position on the shaft;

relieving the pressure from the hydraulic nut;

removing the hydraulic nut from the shaft; and securing the inner race ring of the second bearing in position.

7. A method as claimed in claim 6, wherein the actual hydraulic pressure value is read by way of a scale face plate directly showing the actual axial force applied to the inner race ring of said second bearing.

8. A method as claimed in claim 7, including a calculating unit operatively connected to the gauge and arranged to calculate and display the actual axial force after multiplication of hydraulic pressure and piston area of the hydraulic nut.

9. A method as claimed in claim 7, including using a loose gauge face plate attachable to the gauge and having a graduation showing axial force as a product of temporary pressure value and known area of said hydraulic nut, applying said gauge face plate over a face plate of the gauge, and using values read off the gauge face plate as true axial force values.

* * * * *